United States Patent [19]
Felder

[11] Patent Number: 5,597,492
[45] Date of Patent: Jan. 28, 1997

[54] DEVICE FOR DISCHARGE LIMITATION AND SIMULTANEOUS TEMPORARY STORAGE OF WASTE WATER AND ALSO SEPARATION OF SETTLEABLE AND FLOATING MATTER FROM FOUL WATER AND SUCH A METHOD

[76] Inventor: Anton Felder, Schillerstr. 48, D-87435 Kempten, Germany

[21] Appl. No.: 411,643

[22] PCT Filed: Aug. 4, 1994

[86] PCT No.: PCT/EP94/02597

§ 371 Date: Apr. 5, 1995

§ 102(e) Date: Apr. 5, 1995

[87] PCT Pub. No.: WO95/08717

PCT Pub. Date: Mar. 30, 1995

[30] Foreign Application Priority Data

Sep. 23, 1993 [DE] Germany .......................... 43 32 404.5

[51] Int. Cl.$^6$ .................................................. B01D 21/26
[52] U.S. Cl. ................... 210/787; 210/806; 210/512.1; 210/513; 210/304; 55/459.1; 209/717; 209/721; 209/722
[58] Field of Search .................. 210/512.1, 806, 210/787, 513, 532.1, 532.2, 294, 304; 55/459.1; 209/715, 716, 717, 718, 719, 721, 722

[56] References Cited

FOREIGN PATENT DOCUMENTS

| 507713 | 9/1930 | Germany . |
| 2643029 | 3/1978 | Germany . |
| 3634122 | 4/1988 | Germany . |
| 4025465 | 2/1992 | Germany . |
| 9209785 | 10/1992 | Germany . |

OTHER PUBLICATIONS

English Translation of DE,C,40 25 465 (i.e. PTO 96–2039).

*Primary Examiner*—David A. Reifsnyder
*Attorney, Agent, or Firm*—George W. Dishong

[57] ABSTRACT

The invention relates to a device for discharge limitation and simultaneous temporary storage of waste water and also separation of settleable and floating matter from foul water and is notable for the fact that it comprises a cyclone chamber (2) which is connected to an inlet (1), which is constructed in accordance with the natural spiral shape of the vortex and which comprises round openings (4; 6) at the top and bottom, and in that a rotationally symmetrical container (8) seamlessly adjoins the top opening (6), in which container (8) a guide pipe is disposed which extends centrally from the top opening (6) to just below the upper edge (10) of the container.

19 Claims, 2 Drawing Sheets

DEVICE FOR DISCHARGE LIMITATION AND SIMULTANEOUS TEMPORARY STORAGE OF WASTE WATER AND ALSO SEPARATION OF SETTLEABLE AND FLOATING MATTER FROM FOUL WATER AND SUCH A METHOD

BACKGROUND OF THE INVENTION

1. Field of the Invention

The invention relates to a device for discharge limitation and simultaneous temporary storage of waste water and also to the separation of settleable and floating matter from foul water.

The invention also relates to such a method.

2. Description of the Prior Art

Discharge limiters in which the constrictive action is produced by the spin effect of a vortex flow are disclosed, for example, in German Patent Specification 507 713 and German Patent Specification 26 43 029.5. It is also known that there are cyclone separators which temporarily store the foul water and that a foul-water treatment takes place, as, for example, in German Patent Specification 36 34 122. However, these devices offer at best two or three possible combinations of discharge limitations, storage and separation of settleable and floating matter from foul water.

For environmental protection reasons, untreated foul water should not be fed into the water recirculation system. In the case of heavy rainfalls, however, the sewage treatment plants are incapable of further treating the foul water arriving from the catchment areas, with the result that some of the foul water is temporarily stored in storm-water retention tanks. In this case, it has to be ensured that, during the rainfall and thereafter, only a certain acceptable quantity of water is supplied to the sewage treatment plant from the storm-water retention tank. As a rule, this is achieved by constricting the flow cross section, by diaphragm-like or nozzle-like devices, by the generation of frictional losses in long constricting sections or by the spin effect of a vortex flow (so-called vortex constriction).

In the case of fairly heavy rain persisting for a prolonged period, it may happen that the storage volume of the storm-water retention tank is no longer adequate. The storm-water retention tanks then allow the untreated excess foul water to run into the receiving water course virtually without any treatment. In addition to the discharge limitation, there are consequently efforts to carry out also a more extensive storm-water treatment in future in the form of a pollutant separation in order to protect the receiving water course against anthropogenic contamination.

Hitherto, however, only the requirement of discharge limitation has generally been fulfilled by the devices described above. On the other hand, no methods are known in practice which achieve a discharge limitation and simultaneous temporary storage of waste water and also separation of settleable and floating matter from waste water with one device.

SUMMARY OF THE INVENTION

The object of the invention is to provide a structurally simpler device which is able to ensure simultaneously a discharge limitation, storage and an increase in the separation of settleable and floating matter from foul water. At the same time, the device should be capable of doing without mechanically movable parts which are subject to wear and therefore of operating in a low-maintenance and cost-saving manner.

This should be possible in a single device with minimum erection area.

Surprisingly, this is achieved in a device of the type mentioned at the outset in that it comprises a cyclone chamber which is connected to the inlet and which is constructed in accordance with the natural spiral shape of the vortex, in that said cyclone chamber has round openings one above the other at the top and bottom, and in that a rotationally symmetrical container seamlessly adjoins the top opening, in which container a guide pipe is centrally disposed which extends from the top opening to just below the upper edge of the container.

The method according to the invention for discharge limitation and simultaneous temporary storage of waste water and also separation of settleable and floating matter from foul water is notable for the fact that a spiral flow, in particular a vortex flow, is impressed on an increased inflow and in that additional inflow loading has the effect that the flow above the first flow develops as a second vortex flow in a space [lacuna], the two spiral flows being utilized synergetically to separate solids.

Expediently, a continuous air core is built up, in particular by a guide pipe, centrally in the first and second vortex flows, which air core provides for the constriction.

Surprisingly, the measure according to the invention is capable of doing without mechanically movable parts which are subject to wear and of fulfilling the abovementioned requirements for simultaneous discharge limitation, storage and an increase in the separation.

Erection area is substantially reduced since units hitherto necessary, particularly for the individual functions, are unnecessary.

In the case of dry-weather discharge, the water drains unimpeded through the cyclone chamber via the bottom opening. If the inflow increases in storm weather, the cyclone chamber fills and a spiral flow develops. As a result of the spiral flow, a constrictive action is now established since the flow paths comprise a logarithmic spiral with high flow acceleration toward the bottom opening. The loss principle is therefore based on the fact that high tangential velocities and consequently high centrifugal forces are produced near the axial outlet nozzle, said centrifugal forces generating a counterpressure which keeps the discharge low. Because of the centrifugal forces, an aerated vortex core is formed in the center of the cyclone chamber. In the event of fairly heavy and persistent rain, the rotationally symmetrical container fills up since the discharge from the bottom opening remains constant even with more water flowing in and consequently the excess water flows via the top opening into the container. Numerous smaller rainfalls are consequently absorbed by the container volume alone without water escaping into the receiving water course. If the volume is no longer adequate, the water passes over the circumferential overflow edge into a collecting trough and passes from there into the receiving water course. The crucial point is, however, that a spiral flow is also established in the container and the aeration, and also the stabilization of the vortex core, is maintained by the guide pipe. The constrictive action is furthermore provided even if there is increasingly higher inflow of water.

In the cyclone chamber and in the container there therefore predominates a vortex flow which has extremely low turbulence and is consequently particularly suitable for the separation of pollutants. Fibrous matter, floating matter and solids are already conveyed in the cyclone chamber to the outlet of the chamber. Pollutant particles which nevertheless still get into the rotationally symmetrical container are ultimately conveyed back into the cyclone chamber again via the guide pipe because of the vortex flow prevailing in the container. The vortex flows which are established in the cyclone chamber and in the container have the effect that the separation is reinforced due to a synergism existing between the two vortex flows: as a result, the total separation efficiency is far above that of conventional cyclone separators. A discharge limitation and simultaneous temporary storage of waste water and also separation of settleable and floating matter from waste water can consequently be achieved in one device.

In addition, in a further development of the invention, a salient or appropriately configured downflow baffle can be disposed at a certain distance from the container rim, as a result of which floating matter and greases are advantageously retained in the container. This so-called downflow baffle is attachable to the exterior of the container at the perimeter and along the rim. Such methods or means of mounting or attaching the downflow baffle would be well known to any ordinarily skilled person in the field of design of such containers.

Because of the spiral movement in the container, the transportation of the floating matter and greases to the center of the vortex in a forced manner can be achieved by installing a spiral downflow baffle directed toward the center. In addition, such a spirally shaped downflow baffle also serves to stabilize the aerated vortex core.

According to a further embodiment of the invention, substantial further advantages are established if a downflow baffle spirally shaped toward the center is fitted without using a guide pipe.

BRIEF DESCRIPTION OF THE DRAWINGS

An exemplary embodiment of the invention will now be explained in greater detail by reference to the accompanying drawings, in which.

DESCRIPTION OF THE PREFERRED EMBODIMENT

Figure 1:
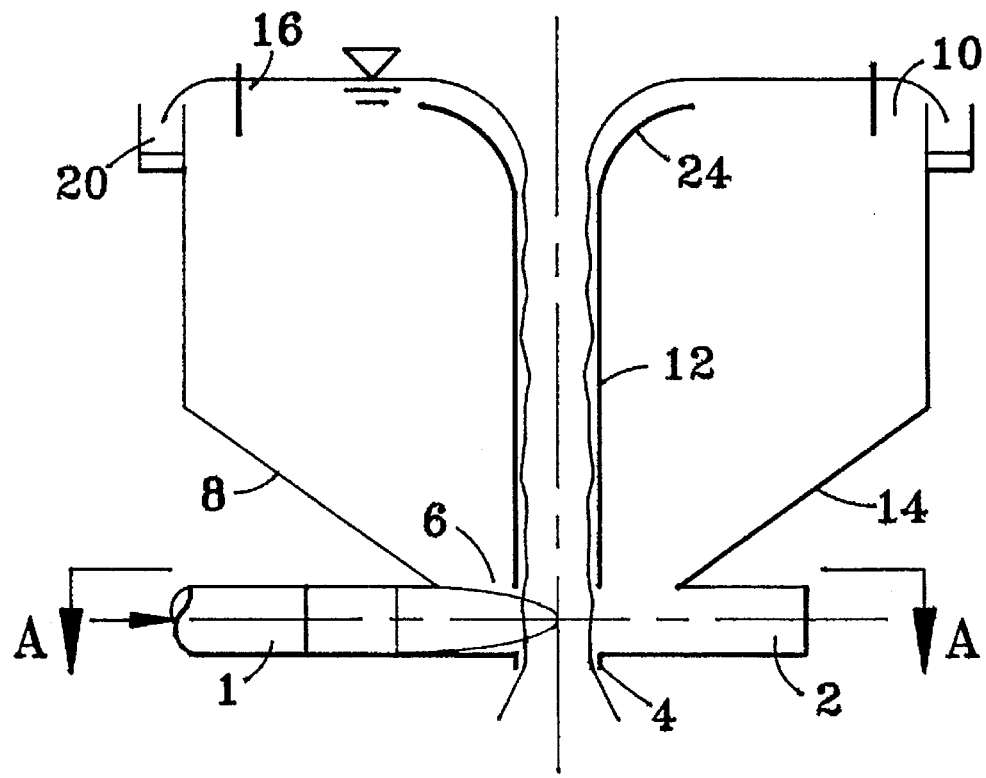
FIG. 1 shows an elevation.
Figure 2:
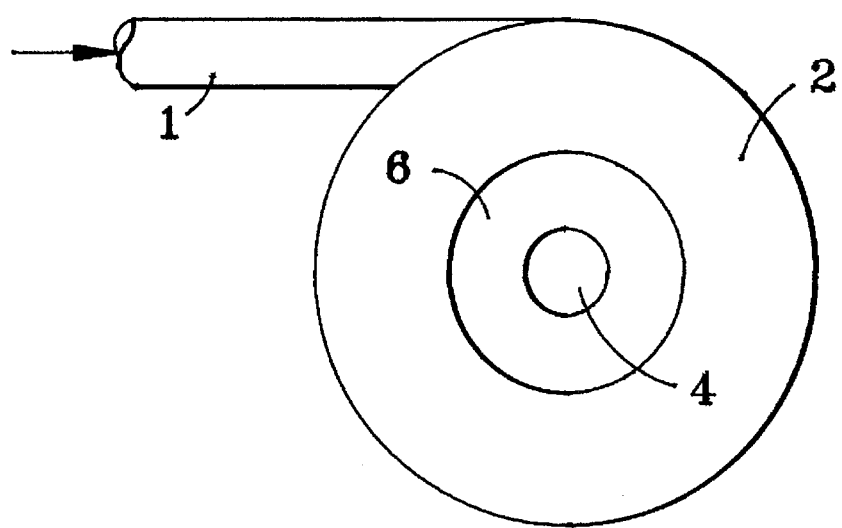
FIG. 2 shows a section of this embodiment along the line A—A in FIG. 1.

The device for discharge limitation and simultaneous temporary storage of waste water and also separation of settleable and floating matter from foul water comprises an inlet 1 into a cyclone chamber 2. Said cyclone chamber is constructed to follow the natural spiral shape of the vortex. The cyclone chamber 2 has openings which are disposed one above the other, namely a bottom opening 4 and an upper, larger opening 6. The conical base 14 of a rotationally symmetrical container 8, which base 14 tapers toward the central axis and (simultaneously) the axis of the openings 4 and 6, adjoins the opening 6 seamlessly. Said base 14 of the rotationally symmetrical container 8 falls off in the direction of the axis of symmetry before it terminates in the top opening 6, which is common to the cyclone chamber and to the container.

The container rim 10 is open in order to make possible an overflow of the water separated from the settleable and floating matter into the collecting trough 20 feeding the receiving water course.

A guide pipe 12 inside which an air core develops when the device is fully or excessively loaded extends centrally up to below the top edge 16 of the container between [sic] the top opening 6 of the cyclone chamber 2.

In the case of dry-weather discharge, the water therefore drains unimpeded through the cyclone chamber 2 and via the bottom opening 4 and is fed directly to the sewage treatment plant. In the event of heavier inflow, the cyclone chamber 2 fills up and a vortex flow develops. The constrictive action which sets in because of the spiral flow and whose cause was explained above is of interest. High tangential velocities and consequently high centrifugal forces which generate a counterpressure which keeps the discharge low are therefore established near the axial outlet nozzle 4. Because of the centrifugal forces, an aerated vortex core forms in the center of the cyclone chamber 2. The rotationally symmetrical container fills up in the event of persistent rain since the discharge from the bottom opening remains constant even with more water flowing in and consequently the excess water flows into the container 8 via the top opening 6. It is important that a spiral flow is also established in the container 8 and the aeration and the stabilization of the vortex core are maintained by the guide pipe 12. A salient downflow baffle 16 may be disposed at a distance from the container rim.

The vortex flows which are established in the cyclone chamber 2 and in the container 8 have the effect that the separation is reinforced due to a synergism existing between the two vortex flows. In a manner similar to the "amplification" of sound which results upon the interaction of high velocity jets of air which are caused to impinge upon each other. When two high velocity jets of air are caused to impinge onto each other the total sound level is greater than the sum of the two sound levels. This jet interaction phenomena is well known and there is a synergistic relationship between the jets upon interaction. Similarly, it is believed, that two jets or high velocity flows of liquid result in synergism. That is, the energy which is generated and which causes the separation appears to be greater than the sum of the energy of each of the vortex flows causing separation. Thus the interaction of the two vortex flows enhances separation within the liquid flow in the device. At, for example, 70%, the total separation percentage [sic] is far above that of conventional cyclone separators of, for example, 35% (which does, however, vary as a function of inflow).

It is astonishing how small the construction of such a device is and how few delicate mechanical parts are necessary.

Figure 3:
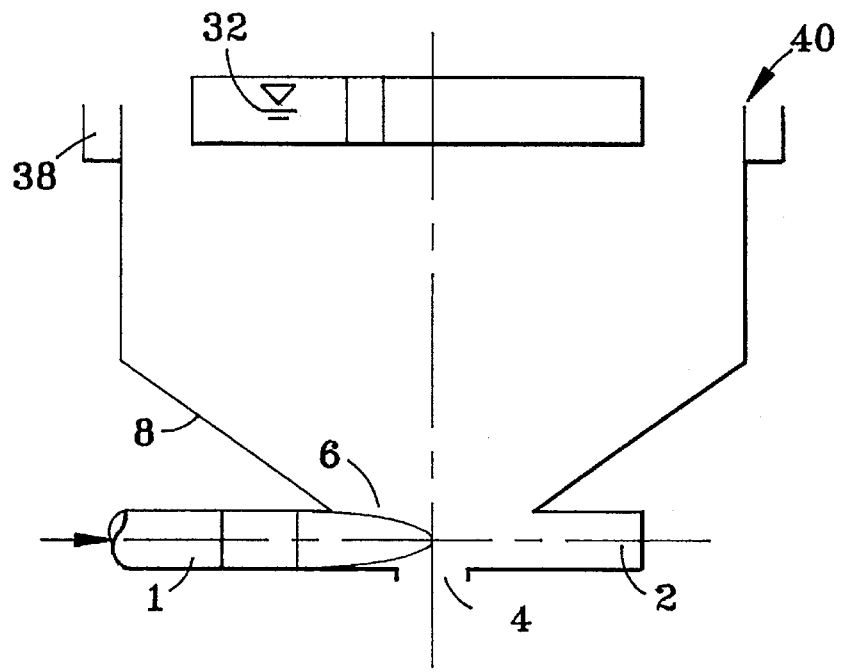
FIG. 3 shows an embodiment with spiral downflow baffle and FIG. 4 is a plan view of FIG. 3.
Figure 4:
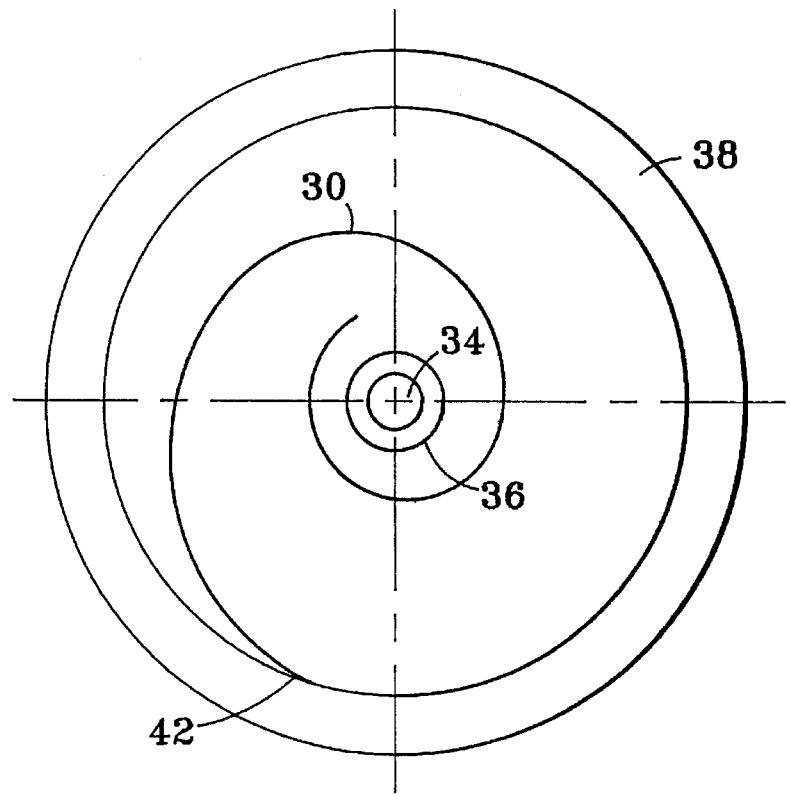

FIGS. 3 and 4 show another embodiment which is particularly suitable for the separation of floating matter and grease and also for the stabilization of the aerated vortex core. The height of the spiral downflow baffle 30 is, for example, 40 cm, 35 cm extending down below the upper edge 40 of the container and 5 cm projecting upward above the upper edge 40 of the container. This embodiment functions without any guide pipe. The downflow baffle 30 spirally shaped toward the center extends away from the container rim 40. The floating particles and grease particles therefore migrate toward the center and are drawn off via the aerated vortex core.

This invention also relates to a method for discharge limitation and simultaneous temporary storage of waste water and also separation of settleable and floating matter from foul water, using the particular apparatus described and defined herein. Particularly the method comprises the steps of: impressing a first spiral vortex flow of the fluid within the container onto an increased inflow, thereby developing that increased inflow as a second vortex flow that has the effect that the first spiral vortex flow above the second spiral vortex flow takes place within a space which is situated in a rotationally symmetrical manner above the space in which the second spiral vortex flow exists, i.e., above the second spiral vortex flow, and utilizing the two spiral flows in a synergistic manner to separate solids. Additionally, using a guide pipe to build a continuous air core further provides for the constriction of the discharge flow, centrally in the first and second vortex flow. During substantial inflow, the matter to be separated into the flow path from a logarithmic spiral is caused to discharge due to the intense flow acceleration toward a bottom opening, and causing excess water to leave the space with an upper spiral flow at the upper edge and in the direction of the receiving water course. Further, during substantial inflow, the matter to be separated into the flow path from a logarithmic spiral is caused to discharge due to the intense flow acceleration toward a bottom opening, further causing excess water to leave the space at an upper spiral flow located at the upper edge and in the direction of the receiving water course.

The reference numerals otherwise used identical [sic] to those of the previous figures have the same function.

In the embodiment disclosed above, the pure circular shape was assumed. A spiral shape (with appropriate constructional adjustment) is, however, possible.

I claim:

1. Device for discharge limitation and temporary storage of waste water and separation of settleable and floating matter from foul water, comprising:

a cyclone having a chamber therein, said cyclone chamber defined substantially by a cylinder wall, said cyclone chamber being connected to an inlet, said cyclone chamber and said inlet constructed in a manner producing thereby, when fluid is flowing into said inlet a natural spiral vortex of fluid flowing into said inlet and said cyclone chamber, said cyclone having a top round opening and a bottom round opening, said top round opening and said bottom round opening being concentrically positioned, said top round opening directed into said cyclone chamber and said bottom round opening directed out of said cyclone chamber;

a container being funnel shaped, having a large diameter end and a small diameter end, shaped seamlessly adjoining said top round opening at the small diameter end of the container, the larger diameter end of said container having an upper edge; and a guide pipe axially directed and axially positioned within said container, said guide pipe having an upper end located just below said upper edge of said container, and a lower end proximate said top round opening.

2. The device according to claim 1, wherein said top round opening of said cyclone chamber is at least equally as large as said bottom round opening.

3. The device according to claim 1, wherein said top round opening of said cyclone chamber is about 1.2 to about 2.3 times as large as said bottom round opening.

4. The device according to claim 3, wherein said guide pipe diameter is about 1.05 to about 1.2 times as large as the diameter of said bottom opening.

5. The device according to claim 1, wherein said guide pipe has at least the same diameter as the diameter of said bottom round opening.

6. The device according to claim 1, wherein said guide pipe diameter is about 1.05 to about 1.2 times as large as the diameter of said bottom opening.

7. The device according to claim 1, wherein said upper end of said guide pipe widens in a trumpet shape.

8. The device according to claim 7, wherein said guide pipe is constructed and attached to said container in a manner making variable a distance between said upper end and said lower end of said guide pipe and making variable a position of said upper end of said guide pipe located just below said upper edge of said container.

9. The device according to claim 1, wherein said guide pipe is constructed and attached to said container in a manner making variable a distance between said upper end and said lower end of said guide pipe and making variable a position of said upper end of said guide pipe located just below said upper edge of said container.

10. The device according to claim 1, wherein an appropriately configured downflow baffle is attached to said larger diameter end of said container upper edge disposed at a set distance from said upper edge of said container.

11. The device according to claim 8, wherein an appropriately configured downflow baffle is attached to said upper edge of said container disposed at a set distance from said upper edge of said container.

12. The device according to claim 1, wherein a downflow baffle is attached to said larger diameter end of said container upper edge and is displaced away from interior walls defining said funnel shaped container said downflow baffle running in a spirally shaped manner toward said small diameter end of said container.

13. The device according to claim 11, wherein a downflow baffle is attached to said larger diameter end of said container upper edge and is displaced away from interior walls defining said funnel shaped container said downflow baffle running in a spirally shaped manner toward said small diameter end of said container.

14. The device according to claim 1, wherein said top of said cyclone chamber is of conical construction.

15. The device according to claim 13, wherein said top of said cyclone chamber is of conical construction.

16. A method for discharge limitation and temporary storage of waste water and separation of settleable and floating material from foul water comprising:

impressing a first spiral vortex flow of a fluid within a container onto an increased inflow, thereby developing that increased inflow as a second spiral vortex flow resulting in the first spiral vortex flowing above the second spiral vortex flow, taking place within a space having a substantially cylindrical geometry, which is situated above the space in which the second spiral vortex flow exists, and utilizing the two spiral flows in a synergistic manner to separate solids.

17. The method according to claim 16, further comprising using a guide pipe to build a continuous air core, and further providing for a constriction, within the center of each said first and second vortex flow.

18. The method according to claim 17, further comprising:

discharging said settleable and floating matter into the flow path of said first and said second spiral vortex flows having intense flow acceleration toward an output opening; and causing excess water leave said substantially cylindrical space with a spiral flow at an upper edge of walls defining said space and directed toward a receiving water course.

19. The method according to claim 16, further comprising:

discharging said settleable and floating matter into the flow path of said first and said second spiral vortex flows having intense flow acceleration toward an output opening; and causing excess water leave said substantially cylindrical space with a spiral flow at an upper edge of walls defining said space and directed toward a receiving water course.

* * * * *